United States Patent Office 3,398,072
Patented Aug. 20, 1968

3,398,072
PROCESS FOR MAKING FLUORINATED NITROSOALKANES
William J. Fraser, Forest Lake, Minn., assignor to the United States of America as represented by the Secretary of the Army
No Drawing. Filed Sept. 30, 1964, Ser. No. 400,605
17 Claims. (Cl. 204—158)

ABSTRACT OF THE DISCLOSURE

Process for producing a fluorinated nitrosoalkane directly from a fluorinated alpihatic carboxylic acid comprising reacting the fluorinated aliphatic carboxylic acid with a nitrosyl halide in the vapor phase under the influence of actinic radiation.

---

This invention relates to fluorinated nitrosoalkanes and to a process for their production.

Halogen-containing nitrosoalkanes are known in the art and have been suggested as monomers for use in producing useful chemically stable plastics and elastomers. For example, trifluoronitrosomethane can be copolymerized with tetrafluoroethylene to produce a high molecular weight elastomeric polymer which has good chemical and heat stability. Numerous methods for the production of the nitrosoalkanes have been suggested. It has been suggested that the fluorine-containing acyl nitrite may be prepared by reacting a fluorine-containing acid salt of a metal with nitrosyl halide. In this instance, the fluorine-containing acyl nitrite is converted to the nitrosoalkane by decarboxylation. This method has a disadvantage in that the extra step of making the fluorine-containing acid salt of the metal must be carried out before carrying out the reaction with the nitrosyl halide to produce the corresponding fluorine-containing acyl nitrite. The fluorine-containing acyl nitrite in another step is then converted by decarboxylation to the corresponding fluorinated nitrosoalkane. It is much to be desired, therefore, to provide a process for the production of fluorinated nitrosoalkanes in as few steps as possible, and preferably by eliminating the requirement for isolating intermediate products, such as a metal salt of a fluorine-containing acid and/or a fluorine-containing acyl nitrite.

It has now been found that trifluoronitrosomethane can be obtained in good yields in a single step by reaction in the vapor phase of a mixture of nitrosyl chloride or nitrosyl bromide with trifluoroacetic acid according to the process of the invention. It has also been found that higher fluorinated nitrosoalkanes, including polynitrosoalkanes, can be obtained by the same procedure.

An object of the invention is to provide a process for the production of trifluoronitrosomethane.

Another object is to provide a process for the production of fluorinated nitrosoalkanes.

Another object is to provide a process for the production of fluorinated polynitrosoalkanes.

Another object is to provide a single step process for producing a fluorinated nitrosoalkane from a fluorinated aliphatic carboxylic acid which does not require the isolation of intermediate products.

Still other objects will become evident hereinafter.

The process of the invention is carried out by exposing a mixture of the selected nitrosyl halide and the selected fluorinated aliphatic carboxylic acid in the vapor phase to actinic radiation such as ultraviolet light, at a temperature preferably in the range of about 75° C. to 250° C. The reaction proceeds according to equation:

$$Q_fCOOH + NOCl \rightarrow Q_fNO + HCl + CO_2$$

wherein $Q_f$ represents a fluorinated aliphatic radical having from 1 to about 12 carbon atoms. It will be understood that the actual reaction mixture also comprises small quantities of other substances formed as secondary reaction products and that the equation illustrates a course of the reaction.

The nitrosyl halides which can be employed are nitrosyl chloride as shown in the equation and nitrosyl bromide. In the latter case one product of the reaction will evidently be hydrobromic acid.

The fluorinated aliphatic carboxylic acids preferably employed in the process of the invention are represented by the formulae:

$$X(CF_2)_nCOOH$$
$$R_fOCF_2CF_2COOH$$
$$Z-CFCl(CF_2-CFCl)_mCF_2COOH$$
$$Z-(CF_2-CFCl)_mCF_2COOH$$

and $$CF_2ClCF_2-(CFClCF_2)_mCFClCOOH$$

wherein X is a member of the group consisting of hydrogen, chlorine and fluorine; Z is a perhalomethyl radical having a total atomic weight not greater than 146.5; $R_f$ is a perfluoroalkyl radical having from 1 to 8 carbon atoms; $n$ is an integer from 1 to 12; and $m$ is a number from 0 to 5.

The formulae $Z(CF_2CFCl)_mCF_2COOH$ and $$Z-CFCl(CF_2-CFCl)_mCF_2COOH$$

are typical of acids derived from oxidation and hydrolysis of polymers including halogenated telomers of such perhalogenated monomers as chlorotrifluoroethylene and the like.

Telomers produced using bromotrichloromethane as a telogen ultimately yield (after oxidation) acids having a terminal trichloromethyl group. Telomers produced using perhalomethanes other than bromotrichloromethane as telogens also yield acids corresponding to the above formulae. The requirement is that the telogen contain a bromine atom and not produce, at the end of the telomer molecule opposite the bromine atoms, an end group which is more easily hydrolyzed than the CFClBr end group which is readily converted to a carboxylic acid end group during oxidation of the telomer. Suitable telogens other than bromotrichloromethane are the perhalogenated methanes: bromotrifluoromethane, bromochlorodifluoromethane, bromodichlorofluoromethane, dibromodifluoromethane, and dibromochlorofluoromethane. All of these latter telogens produce telomers containing a CFClBr group at one end of the molecule and containing at the opposite end a perhalomethyl group that is a Z group which is not more susceptible to hydrolysis than the aforesaid CFClBr group. Respectively, the Z groups are $CF_3$, $CClF_2$, $CFCl_2$, $CBrF_2$, $CFBrCl$. For convenience, these perhalomethyl terminal groups may be designated collectively as those having a total atomic weight not higher than 146.5, the atomic weight of the bromochlorofluoromethyl group.

These materials can be hydrolyzed, as with fuming sulfuric acid, as described in United States Patents 2,806,-665 and 2,806,666, to yield a variety of fluorinated acids. Oxidation of the polymers as described in United States Patent 2,863,916 also yields fluorinated acids of this type. Such fluorinated acids are equivalents for the purposes of this invention.

Acids of the formula:

$$X(CF_2)_nCOOH$$

when X is F are simple perfluoroalkanoic acids and are available by electrochemical fluorination of the appropriate alkonoic acid. Such acids are described, for example, in U.S. Patent No. 2,567,011. Acids in which X is H are described in U.S. Patents Nos. 2,559,629 and 2,559,630. Acids in which X is Cl are prepared by oxidation of α-hydro-ω-chloro perfluoroalkanes as described by Severson and Brice in Journal of the American Chemical Society, vol. 80, pages 2313 to 2316 (1958). Acids of the type $R_fOCF_2CF_2COOH$ are available as described in U.S. Patent No. 2,713,593.

While the foregoing fluorinated aliphatic carboxylic acids are preferred, other fluorinated aliphatic carboxylic acids, such as fluorinated dicarboxylic acids and fluorinated polycarboxylic acids, may be employed in the process of the invention to produce the corresponding fluorinated polynitrosoalkanes. By way of example, perfluorosuccinic acid can be employed to produce 1,2-dinitrosotetrafluoroethane; similarly, perfluoroglutaric acid can be employed to produce 1,3-dinitrosopropane; also similarly, perfluorotricarballylic acid can be employed to produce 1,2,3-trinitrosopentafluoropropane. Other fluorinated polybasic aliphatic acids which may be used in the process will occur to those skilled in the art.

An inert diluent in the vapor phase can be usefully employed because it serves to moderate and control the reaction in such a way that explosions are avoided and smooth, safe, continuous operation of the process for extended periods of time is possible. A diluent gas also provides a carrier for less volatile fluorinated aliphatic carboxylic acids and permits use of lower temperatures in vapor phase reactions. Gaseous diluents which can be employed include such gases as nitrogen, helium and carbon dioxide; these gases are inert for the purposes of the invention. The inert gases must be selected from materials which do not absorb the actinic radiation to an extent which will interfere with the reaction. Alternatively, but somewhat less conveniently, the reaction can be conducted in vacuo. In this way the reduction of pressure without the addition of diluent gas is seen to be the equivalent of dilution.

Actinic light of wavelengths from about 4000 A. to about 2200 A. and preferably from about 3600 A. to about 3000 A. is furnished by an ultraviolet source, such as a BH–6 lamp. Such sources are readily available. Other sources of actinic radiation include sunlight, as well as sources of gamma radiation from radioisotopes and the like. Further data on the characteristics of actinic sources and methods of operation are given in the article "Photo-Chemical Engineering" by C. M. Doede and C. A. Walker in Chemical Engineering for February 1955, pages 159 through 178, herein incorporated by reference. Because light of the actinic range is largely absorbed by glass, it is most satisfactory to provide the light source within the reaction vessel which may be of the form of a flask or of a tube for continuous passage of vapors past the light source at a rate commensurate with the energy provided. Since quartz transmits ultraviolet light well, the reaction vessel may be made of quartz and the actinic light source may be outside the reaction vessel.

Although heating is not necessary, sufficient heat to maintain the reactants in the vapor phase is desirable during the reaction. By passing the mixture of reactants and diluent gases through a tube containing the source of actinic radiation and heated to the optimal temperature for the particular reaction mixture, the process can be made continuous. The desired product is readily isolated from the reaction mixture, which contains the co-products, carbon dioxide and halogen acid, and minor quantities of by-products. Unreacted starting materials can be recycled if desired. The desired fluorinated nitrosoalkane product is recovered by condensation of the total product, washing with water to remove carbon dioxide, oxides of nitrogen and other by products and distillation.

The process of the invention requires a period of reaction which varies depending upon other conditions such as the temperature, the intensity of the actinic radiation and the concentration of the starting materials. The progress of the reaction is readily followed by visually observing the formation of the blue fluorinated nitrosoalkane.

The fluorinated nitrosoalkanes formed by the process of this invention are useful comonomers with perfluoroolefins for the preparation of elastomers having advantageous properties. For example, the copolymer of trifluoronitrosomethane and tetrafluoroethylene is a rubber with good low-temperature flexibility and solvent resistance. Other fluorinated nitrosoalkanes provide useful polymers with varying characteristics, all of which are solvent-resistant and oleophobic.

Now, having described the process of the invention in broad terms, it is more specifically illustrated by means of the following particular example which serves to show the best mode presently contemplated of practicing the invention without thereby limiting the same. In this example parts are by weight except where otherwise specified.

Example 44.5 gms. (0.39 mole) of trifluoroacetic acid is introduced into a quartz flask which is connected to a water condenser and the water condenser in turn is connected to a Dry Ice-acetone condenser. Nitrosyl chloride vapors are bubbled through the trifluoroacetic acid until the latter is saturated with nitrosyl chloride. The trifluoroacetic acid and nitrosyl chloride in the quartz flask are irradiated by means of a BH–6 lamp which produces high intensity ultraviolet radiation at 3000–3600 A. as well as considerable heat, which rapidly brings the trifluoroacetic acid to its boiling point, causing reflux in the system. Nitrosyl chloride is continuously admitted to the system at a rate sufficient to cause refluxing thereof from the Dry Ice-acetone condenser above the water condenser. Within a few minutes after starting the irradiation, blue vapors of evolving trifluoronitrosomethane are visible in the overhead condenser. After six hours of irradiating the mixture of trifluoroacetic acid and nitrosyl chloride with refluxing, the product gases are passed through a trap cooled to −78° C. to remove unreacted nitrosyl chloride and oxides of nitrogen. The product trifluoronitrosomethane is collected in a liquid nitrogen trap from which it is removed and purified by water scrubbing to remove carbon dioxide, oxides of nitrogen, and traces of inorganic impurities. After the water scrubbing, the trifluoronitrosomethane may be further purified by distillation to remove small amounts of other impurities or it may be used directly in a polymerization reaction with a wide variety of monomers to produce useful polymers, such as low temperature flexible nitroso rubber and the like. The yield of trifluoronitrosomethane is 10.5 gms., 60% of theory based on 15.6 gms. (0.135 mole) of trifluoroacetic acid consumed. The remaining trifluoroacetic acid is recovered and used again. The trifluoronitrosomethane is identified by infrared analysis.

Other fluorinated nitrosoalkanes are prepared in a similar manner starting with the corresponding fluorinated aliphatic carboxylic acid. In the case of high molecular weight acids, it may be necessary to introduce additional heat and/or to employ reduced pressure in the system in order to effect boiling of the acid so that the reaction between the nitrosyl halide and the fluorinated aliphatic carboxylic acid can take place in the vapor phase.

The following table sets forth other fluorinated aliphatic carboxylic acids as well as several halogenated aliphatic carboxylic acids containing chlorine and fluorine which may be employed in producing the halogenated nitrosoalkane product listed in the table. The temperature and pressure conditions must be adjusted in accordance with the physical properties of the acid so that the reaction may take place in the vapor phase.

TABLE 1

| Halogenated Alkanoic Acid | Halogenated Nitrosoalkane |
|---|---|
| $C_2F_5COOH$ | $C_2F_5NO$ |
| $C_3F_7COOH$ | $C_3F_7NO$ |
| $C_4F_9COOH$ | $C_4F_9NO$ |
| $C_5F_{11}COOH$ | $C_5F_{11}NO$ |
| $C_8F_{17}COOH$ | $C_8F_{17}NO$ |
| $C_9F_{19}COOH$ | $C_9F_{19}NO$ |
| $C_{12}F_{25}COOH$ | $C_{12}F_{25}NO$ |
| $CF_3OC_2F_4COOH$ | $CF_3OC_2F_4NO$ |
| $C_2F_5OC_2F_4COOH$ | $C_2F_5OC_2F_4NO$ |
| $C_3F_7OC_2F_4COOH$ | $C_3F_7OC_2F_4NO$ |
| $C_5F_{11}OC_2F_4COOH$ | $C_5F_{11}OC_2F_4NO$ |
| $C_6F_{13}OC_2F_4COOH$ | $C_6F_{13}OC_2F_4NO$ |
| $C_8F_{17}OC_2F_4COOH$ | $C_8F_{17}OC_2F_4NO$ |
| $CF_2ClCFClCF_2COOH$ | $CF_2ClCFClCF_2NO$ |
| $CF_2ClCFClCF_2CFClCF_2COOH$ | $CF_2ClCFClCF_2CFClCF_2NO$ |
| $CF_2ClCFCl(CF_2CFCl)_2CF_2COOH$ | $CF_2ClCFCl(CF_2CFCl)_2CF_2NO$ |
| $CF_2ClCFCl(CF_2CFCl)_4CF_2COOH$ | $CF_2ClCFCl(CF_2CFCl)_4CF_2NO$ |
| $CCl_3CF_2CFClCF_2COOH$ | $CCl_3CF_2CFClCF_2NO$ |
| $CCl_3(CF_2CFCl)_2CF_2COOH$ | $CCl_3(CF_2CFCl)_2CF_2NO$ |
| $CCl_3(CF_2CFCl)_3CF_2COOH$ | $CCl_3(CF_2CFCl)_3CF_2NO$ |
| $CCl_3(CF_2CFCl)_5CF_2COOH$ | $CCl_3(CF_2CFCl)_5CF_2NO$ |
| $H(CF_2)_6COOH$ | $H(CF_2)_6NO$ |
| $H(CF_2)_4COOH$ | $H(CF_2)_4NO$ |
| $H(CF_2)_{11}COOH$ | $H(CF_2)_{11}NO$ |
| $Cl(CF_2)_4COOH$ | $Cl(CF_2)_4NO$ |
| $Cl(CF_2)_6COOH$ | $Cl(CF_2)_6NO$ |
| $ClCF_2COOH$ | $ClCF_2NO$ |
| $CF_2ClCF_2CFClCOOH$ | $CF_2ClCF_2CFClNO$ |

While the invention has been described in terms of the production of fluorinated nitrosoalkanes from fluorinated aliphatic carboxylic acids, it is to be understood that other halogenated acids of many different types may be similarly employed to produce the corresponding halogenated nitroso derivative of a hydrocarbon, both of the saturated and unsaturated types. Other halogens than fluorine may be substituted in the hydrocarbon chain. There also may be a mixture of halogens substituted in the hydrocarbon chain. Halogenated unsaturated acids may be employed, for example, such acids as chloromaleic acid, bromomaleic acid, or fluoromaleic acid may be employed to produce the corresponding halogenated dinitrosoethylene. Also the B-halogenated acrylic acids may be employed to produce the corresponding 2-halogenated nitrosoethylenes. Accordingly, my process is a simple and efficient one-step method of making a very large number of highly useful monomers for incorporation in halogenated nitroso-type polymers.

Various modifications of the described procedure as well as changes in ratios of the reactants and other reaction conditions may be utilized to effect the reaction without departing from the scope of this invention as defined in the appended claims.

I claim:

1. A process for the production of a fluorinated nitrosoalkane, which comprises mixing a fluorinated aliphatic carboxylic acid with a nitrosyl halide selected from the group consisting of nitrosyl chloride and nitrosyl bromide, exposing said mixture in the vapor phase to actinic radiation until a substantial quantity of said fluorinated nitrosoalkane is produced, and separating said fluorinated nitrosoalkane from said mixture.

2. The process according to claim 1, in which the actinic radiation employed is ultraviolet light in the range of wavelengths from about 4000 A. to about 2200 A.

3. The process according to claim 1, in which the actinic radiation employed is ultraviolet light in the range of wavelengths from about 3600 A. to about 3000 A.

4. A process for the production of a fluorinated nitrosoalkane selected from the group consisting of fluorinated nitrosoalkanes of the formulae:

$$X(CF_2)_nNO$$
$$R_fOCF_2CF_2NO$$
$$Z-CFCl(CF_2-CFCl)_mCF_2NO$$
$$Z-(CF_2-CFCl)_mCF_2NO$$

and $$CF_2ClCF_2(CFClCF_2)_mCFClNO$$

wherein X represents a member of the group consisting of hydrogen, chlorine and fluorine, Z is a perhalomethyl radical having a total atomic weight not greater than 146.5, $R_f$ is a perfluoroalkyl radical having from 1 to 8 carbon atoms, $n$ is an integer from 1 to 12, and $m$ is a number from 0 to 5; which comprises forming a mixture of an acid selected from the group represented by the formulae:

$$X(CF_2)_nCOOH$$
$$R_fOCF_2CF_2COOH$$
$$Z-CFCl(CF_2-CFCl)_mCF_2COOH$$
$$Z-(CF_2-CFCl)_mCF_2COOH$$

and $$CF_2ClCF_2(CFClCF_2)_mCFClCOOH$$

wherein X, Z, $R_f$, $n$ and $m$ have the same significance as before, with a nitrosyl halide of the group consisting of nitrosyl chloride and nitrosyl bromide, thereafter irradiating said mixture in the vapor phase with ultraviolet light, and separating said fluorinated nitrosoalkane from said mixture.

5. The process according to claim 4, in which the ultraviolet light employed is in the range 3000–3600 A.

6. A process for the production of a fluorinated nitrosoalkane of the formula:

$$X(CF_2)_nNO$$

wherein X represents a member of the group consisting of hydrogen, chlorine and fluorine and $n$ is an integer from 1 to 12; which comprises forming a mixture of an acid of the formula:

$$X(CF_2)_nCOOH$$

wherein X and $n$ have the same significance as before, with a nitrosyl halide of the group consisting of nitrosyl chloride and nitrosyl bromide, thereafter irradiating said mixture in the vapor phase with ultraviolet light, and separating said fluorinated nitrosoalkane from said mixture.

7. The process according to claim 6, in which the ultraviolet light employed is in the range 3000–3600 A.

8. A process for the production of a fluorinated nitrosoalkane of the formula:

$$R_fOCF_2CF_2NO$$

wherein $R_f$ is a perfluoroalkyl radical having from 1 to 8 carbon atoms; which comprises forming a mixture of an acid of the formula:

$$R_fOCF_2CF_2COOH$$

wherein $R_f$ has the same significance as before, with a nitrosyl halide of the group consisting of nitrosyl chloride and nitrosyl bromide, thereafter irradiating said mixture in the vapor phase with ultraviolet light, and separating said fluorinated nitrosoalkane from said mixture.

9. The process according to claim 8, in which the ultraviolet light employed is in the range 3000–3600 A.

10. A process for the production of a fluorinated nitrosoalkane of the formula:

$$Z-CFCl(CF_2-CFCl)_mCF_2NO$$

wherein Z is a perhalomethyl radical having a total atomic weight not greater than 146.5, and $m$ is a number from 0 to 5; which comprises forming a mixture of an acid of the formula:

$$Z-CFCl(CF_2-CFCl)_mCF_2COOH$$

wherein Z and $m$ have the same significance as before, with a nitrosyl halide of the group consisting of nitrosyl chloride and nitrosyl bromide, thereafter irradiating said mixture in the vapor phase with ultraviolet light, and separating said fluorinated nitrosoalkane from said mixture.

11. The process according to claim 10, in which the ultraviolet light employed is in the range 3000–3600 A.

12. A process for the production of a fluorinated nitrosoalkane of the formula:

$$Z-(CF_2-CFCl)_mCF_2NO$$

wherein Z is a perhalomethyl radical having a total atomic weight not greater than 146.5 and *m* is a number from 0 to 5; which comprises forming a mixture of an acid of the formula:

Z—(CF$_2$CFCl)$_m$CF$_2$COOH wherein Z and *m* have the same significance as before, with a nitrosyl halide of the group consisting of nitrosyl chloride and nitrosyl bromide, thereafter irradiating said mixture in the vapor phase with ultraviolet light, and separating said fluorinated nitrosoalkane from said mixture.

13. The process according to claim 12, in which the ultraviolet light is in the range 3000–3600 A.

14. A process for the production of a fluorinated nitrosoalkane of the formula:

CF$_2$ClCF$_2$(CFClCF$_2$)$_m$CFClNO wherein *m* is a number from zero to 5, which comprises forming a mixture of an acid of the formula:

CF$_2$ClCF$_2$(CFClCF$_2$)$_m$CFClCOOH wherein *m* has the same significance as before, with a nitrosyl halide of the group consisting of nitrosyl chloride and nitrosyl bromide, thereafter irradiating said mixture in the vapor phase with ultraviolet light, and separating said fluorinated nitrosoalkane from said mixture.

15. The process according to claim 14, in which the ultraviolet light is in the range 3000–3600 A.

16. A process for the production of trifluoronitrosomethane, which comprises the step of treating trifluoroacetic acid with a nitrosyl halide of the group consisting of nitrosyl chloride and nitrosyl bromide in the vapor phase while being irradiated with ultraviolet light.

17. The process according to claim 16, in which the ultraviolet light employed is in the range of wavelengths from about 3600 A. to about 3000 A.

References Cited

UNITED STATES PATENTS 3,160,660  12/1964  Park et al. _____ 204—158

HOWARD S. WILLIAMS, *Primary Examiner.*